(12) United States Patent
Vidwans et al.

(10) Patent No.: US 7,734,733 B1
(45) Date of Patent: Jun. 8, 2010

(54) WAFS DISCONNECTED-MODE READ-WRITE ACCESS

(75) Inventors: Hrishikesh A. Vidwans, Edison, NJ (US); Suresh Gopalakrishnan, East Windsor, NJ (US); Shirish H. Phatak, Somerset, NJ (US); Murali Rangarajan, South Plainfield, NJ (US)

(73) Assignee: Packeteer, Inc., Cupertino, CA (US)

( * ) Notice: Subject to any disclaimer, the term of this patent is extended or adjusted under 35 U.S.C. 154(b) by 459 days.

(21) Appl. No.: 11/763,755

(22) Filed: Jun. 15, 2007

(51) Int. Cl.
*G06F 15/16* (2006.01)

(52) U.S. Cl. .................. 709/219; 709/217; 709/223; 707/10; 707/200

(58) Field of Classification Search .............. 709/203, 709/219, 223, 224, 217; 711/145, 161; 707/10, 707/200

See application file for complete search history.

(56) References Cited

U.S. PATENT DOCUMENTS

| | | | |
|---|---|---|---|
| 5,452,447 A | 9/1995 | Nelson et al. | |
| 5,594,863 A | 1/1997 | Stiles | |
| 5,611,049 A | 3/1997 | Pitts | |
| 5,634,122 A | 5/1997 | Loucks et al. | |
| 5,689,706 A | 11/1997 | Rao et al. | |
| 5,706,435 A | 1/1998 | Barbara et al. | |
| 5,717,897 A | 2/1998 | McCrory | |
| 5,740,370 A | 4/1998 | Battersby et al. | |
| 5,805,809 A | 9/1998 | Singh et al. | |
| 5,864,837 A | 1/1999 | Maimone | |
| 5,878,218 A | 3/1999 | Maddalozzo et al. | |
| 5,881,229 A | 3/1999 | Singh et al. | |
| 6,012,085 A | 1/2000 | Yohe et al. | |
| 6,049,874 A | 4/2000 | McClain et al. | |
| 6,119,151 A | 9/2000 | Cantrell et al. | |
| 6,122,629 A | 9/2000 | Walker et al. | |
| 6,243,760 B1 | 6/2001 | Armbruster et al. | |
| 6,366,952 B2 | 4/2002 | Pitts | |
| 6,397,307 B2 * | 5/2002 | Ohran | 711/161 |
| 6,453,404 B1 | 9/2002 | Bereznyi et al. | |
| 6,505,241 B2 | 1/2003 | Pitts | |
| 6,587,921 B2 | 7/2003 | Chiu et al. | |
| 6,597,956 B1 | 7/2003 | Aziz et al. | |
| 6,609,183 B2 | 8/2003 | Ohran | |
| 6,944,676 B1 | 9/2005 | Armbruster et al. | |
| 2001/0011300 A1 | 8/2001 | Pitts | |

(Continued)

OTHER PUBLICATIONS

Carey, M.J., M.J. Franklin, M. Livny and E.J. Shekita, "Data Caching Tradeoffs in Client-Server DBMS Architectures", Proceedings of the 1991 ACM SIGMOD International Conference on Management of Data, Feb. 1991, pp. 357-366.

(Continued)

*Primary Examiner*—Frantz B Jean
(74) *Attorney, Agent, or Firm*—Baker Botts L.L.P.

(57) ABSTRACT

The present invention, in particular embodiments, provides methods, apparatuses and systems directed to providing a Wide Area File System that is robust against network connectivity issues. In particular implementations, the present invention provides a WAFS disconnected-mode read-write access that provides for a more seamless user experience against WAN or other network connectivity failures. Specific embodiments provide for management, at a network device such as an EFG node, of file objects previously opened during a connected state with a remote file server appliance, creation of new file objects during a disconnected state and re-synchronization of those file objects (data and meta-data) when a connection becomes available.

20 Claims, 11 Drawing Sheets

U.S. PATENT DOCUMENTS

| | | | |
|---|---|---|---|
| 2001/0016896 | A1 | 8/2001 | Pitts |
| 2001/0047482 | A1 | 11/2001 | Harris et al. |
| 2001/0052058 | A1 | 12/2001 | Ohran |
| 2002/0083111 | A1 | 6/2002 | Row et al. |
| 2002/0144068 | A1 | 10/2002 | Ohran |
| 2004/0260768 | A1* | 12/2004 | Mizuno ............ 709/203 |
| 2007/0260717 | A1* | 11/2007 | Kano ............ 709/223 |

OTHER PUBLICATIONS

Cox, A.L. and R.J. Fowler, "Adaptive Cache Coherency for Detecting Migratory Shared Data", Proceedings of the 20$^{th}$ Annual International Symposium on Computer Architecture, 1993, pp. 98-108.

Cortes, T., S. Girona and J. Labarta, "Avoiding the Cache Coherence Problem in a Parallel/Distributed File System," Proceedings of the High-Performance Computing and Networking Conference, Apr. 1997, pp. 860-869.

Cortes, T., S. Girona and J. Labarta, "Design Issues of a Cooperative Cache with no Coherence Problems," Proceedings of the 5$^{th}$ Workshop on I/O in Parallel and Distributed Systems, Nov. 17, 1997; pp. 37-46.

Wang, J. "A Survey of Web Caching Schemes for the Internet", ACM SIGCOMM Computer Communication Review, vol. 29, No. 5, Oct. 1999, pp. 36-46.

Wu, K-L and P.S. Yu, "Local Replication for Proxy Web Caches with Hash Routing," Proceedings of the CIKM '99, Nov. 1999, pp. 69-76.

Luo, Q., et al., "Middle-Tier Database Caching for e-Business," Proceedings of the 2002 ACM SIGMOD Conference, Jun. 4-6, 2002, pp. 600-611.

Gray, C.G. and D.R. Cheriton. "Leases: An Efficient Fault-Tolerant Mechanism for Distributed File Cache Consistency", Proceedings of the 12$^{th}$ ACM Symposium on Operating Systems Principles, pp. 202-210, Nov. 1989.

Satyanarayanan, M., et al., "Coda File System User and System Administrators Manual", Carnegie Mellon University, Aug. 1997.

Braam, P.J. and P.A. Nelson, "Removing Bottlenecks in Distributed Filesystems: Coda and InterMezzo as Examples". Proceeding of the Linux Expo 1999, May 1999.

Braam, P.J., M. Callahan and P. Schwan, "The InterMezzo File System", Proceedings of the Perl Conference 3, O'Reilly Open Source Convention, Aug. 1999.

Phatak, S.H., and B.R. Badrinath, "Data Partitioning for Disconnected Client Server Databases", Proceedings of the 1$^{st}$ ACM International Workshop on Data Engineering and Wireless Mobile Access, pp. 102-109, 1999.

Tierney B.L., et al., "A Network-Aware Distributed Storage Cache for Data Intensive Environments", Proceedings of the 8$^{th}$ IEEE International Symposium on High Performance Distributed Computing, pp. 185-193, 1999.

Braam, P.J., "InterMezzo: File Synchronization with InterSync", Carnegie Mellon University, Mar. 20, 2002.

Tacit Networks, Inc. ("Tacit Networks Delivers LAN-Speed Access to Data over WANs") press release, Dec. 9, 2002.

Satyanarayanan, M., "Coda: A Highly Available File System for a Distributed Workstation Environment (#13)", Proceedings of the Second IEEE Workshop on Workstaton Operating Systems, Pacific Grove, CA, Sep. 1989.

Braam, P.J. "The Coda Distributed File System (#74)", Linux Journal, No. 50, Jun. 1998.

* cited by examiner

WAFS DISCONNECTED-MODE READ-WRITE ACCESS

TECHNICAL FIELD

The present disclosure relates to file sharing and file access over networks.

BACKGROUND

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data.

In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations connected across WANs, while also providing interoperability with standard file sharing protocols such as NFS and CIFS.

WAFS systems typically consist of edge file gateway (EFG) appliances (or servers), which are placed at multiple offices, and one or more remote file server appliances, at a remote office relative to the EFG appliance, that allow storage resources to be accessed by the EFG appliances. Each EFG appliance appears as a local fileserver to office users. Together, the EFG appliances and remote file server appliance implement a distributed file system and communicate using a WAN-optimized protocol. This protocol is translated back and forth to NFS and CIFS at either end, to communicate with the user applications and the remote storage.

The WAN-optimized protocol typically includes file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files and the ability to serve cached data to users while minimizing the overhead of expensive kernel-user communication and context switches, in effect enabling the cache to act just like a high-performance file server. Typically, the cache attempts to mirror the remote data center exactly, so that "read" requests will be satisfied from the local cache with only a few WAN round trips required to check credentials and availability of file updates.

In WAFS systems, "write" operations should maintain data coherency, i.e., file updates ("writes") from any one office should not to conflict with updates from another office. To achieve data coherency, some WAFS systems use file leases. Leases define particular access privileges to a file from a remote office. If a user at an office wants to write to a cached file, the EFG appliance at that office obtains a "write lease", i.e., a right to modify the document before it can do so. The WAFS system ensures that at any time there will be only one office that has the write lease on a particular file. Also, when a user at another office tries to open the file, the EFG appliance that has the write lease flushes its data first and optionally can give up the write lease if there are no active writers to the file.

Applications, such as Microsoft Word®, typically save changes to a file, for example during user-level commands such as "save" and "save as," as temporary files. Once a user closes the file, the stored version is constructed based on a version of the file when it was opened and the temporary files. When a write lease is obtained for a file, the temporary files are stored at the remote file server appliance as they are generated. Accordingly, those user-level operations or commands, "save," "save as," etc., may cause an application to issue file level requests or primitives associated with the file and the temporary files. It should also be noted that each temporary file also typically will require a lease.

When a period of WAN dis-connectivity commences, files already open with a write lease typically are prevented from being saved to an EFG appliance cache as the file requests and primitives associated with the file and temporary files that implement user-level commands can not be transmitted to the remote file sharing appliance. Additionally, creating new files and folders is also typically prevented. While the WAN is disconnected, users may temporarily save files at their workstation, for example, and then manually copy it to the remote file server appliance once the WAN reconnects.

SUMMARY

The present invention, in particular embodiments, provides methods, apparatuses and systems directed to providing a Wide Area File System that is robust against network connectivity issues. In particular implementations, the present invention provides a WAFS disconnected-mode read-write access that provides for a more seamless user experience against WAN or other network connectivity failures. Specific embodiments provide for management, at a network device such as an EFG node, of file objects previously opened during a connected state with a remote file server appliance, creation of new file objects during a disconnected state and re-synchronization of those file objects (data and meta-data) when a connection becomes available.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Aspects of the claimed embodiments are directed to providing a Wide Area File System that is robust against network connectivity issues. In particular implementations, the present invention provides a WAFS disconnected-mode read-write access that provides for a more seamless user experience against WAN or other network connectivity failures. Specific embodiments provide for management, at a network device such as an EFG node, of file objects previously opened during a connected state with a remote file server appliance, creation of new file objects during a disconnected state and re-synchronization of those file objects (data and meta-data) when a connection becomes available.

This is realized, in part, via a WAN connection state machine implemented as part of the network device. The WAN connection state machine is operative to transition the network device to various states based on a connection status between the network device and the remote file server appliance. In addition, transition between two specific states is based partly on completion of file object synchronization.

If a connection between the network device and the remote file server appliance is lost, the WAN connection state machine transitions the network device to an unconnected state. During the unconnected state, the network device does not send requests for data to the remote file server appliance and instead tracks commands performed on file objects in a manner partly based on a write lease status of the file object.

When the WAN connection state machine detects re-establishment of the connection to the remote file server appliance, the WAN connection state machine transitions the network device from the unconnected state to a re-integration state wherein portions of the tracked commands are synchronized with the remote file server appliance and leases are validated, as necessary. Once the synchronization is complete, the WAN connection state machine transitions the network device to the connected state.

Before a full description of the claimed embodiments is presented, various environments will first be described in which those claimed embodiments may operate.

A. Network Environment

Figure 1:
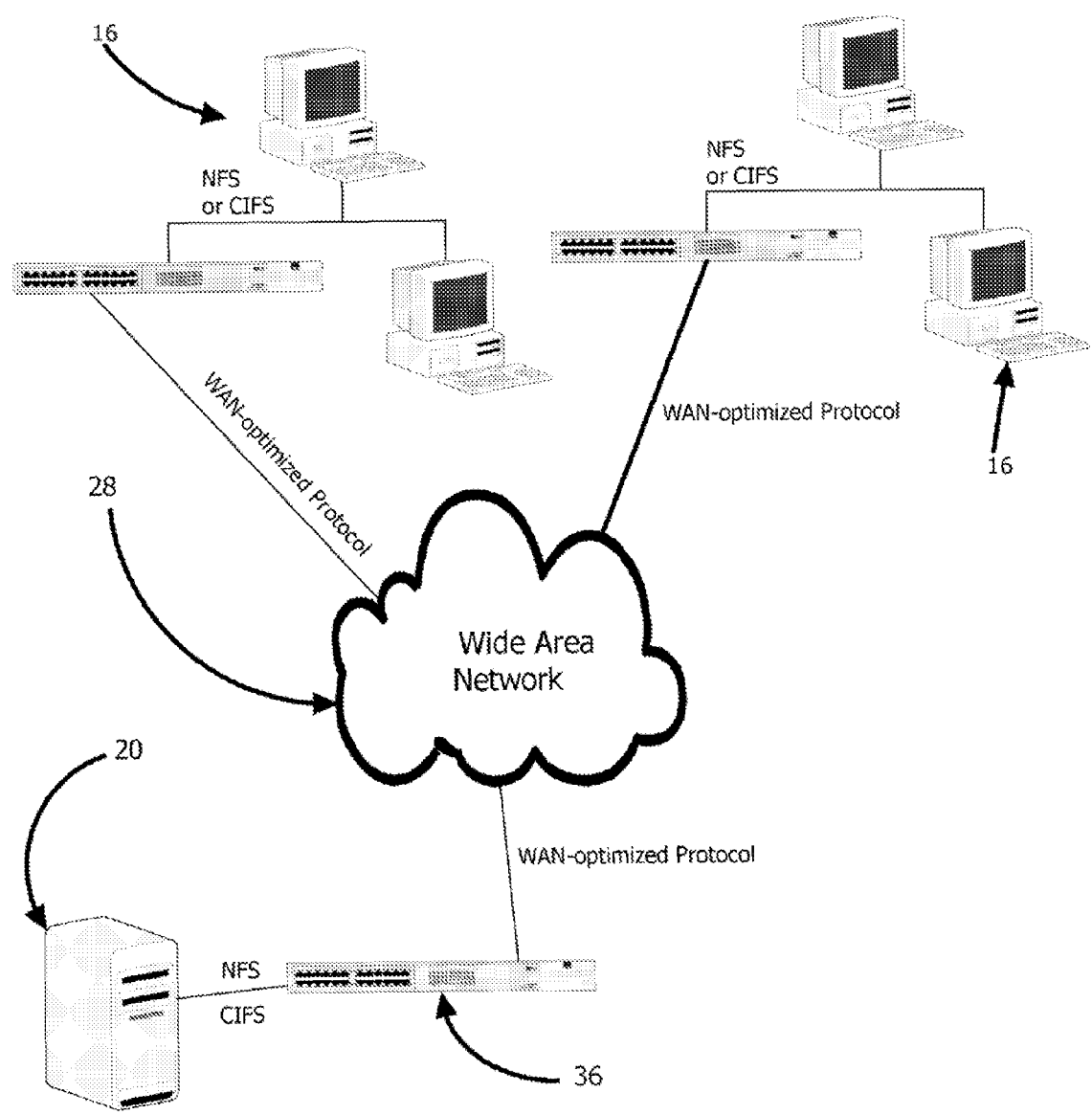
FIG. 1 is a high-level block diagram illustrating an example computer network environment in which embodiments of the present invention might operate.

As discussed in the background above, WAFS systems often include one or more EFG appliances (or servers) and one or more remote file server appliances (or servers), typically at a different location, that allow storage resources to be accessed by the EFG appliances on behalf of workstations 16. FIG. 1 shows at a high level such an arrangement, which might be used with an embodiment of the present invention. In particular, FIG. 1 shows a WAN 28 connecting a remote file server appliance 36 to two EFG appliances 102. In turn, the remote file server appliance 36 is connected, via a LAN or other network, to a file server 20 and the EFG appliances 102 are connected, again via a LAN or other network, to workstations 16. It can be appreciated that EFG appliances 102 may also be remote file server appliances with respect to data stored on resources operably connected to the same LAN or subnet.

In particular embodiments, the remote file server appliance 36 and the EFG appliances 102 communicate over the WAN 28 using a WAN-optimized protocol. However, this is probably not true of the communication between the remote file server appliance 36 and the file server 20, which communication typically uses a protocol such as CFS or NFS. Likewise a protocol such as CFS or NFS is typically used for communication between EFG appliances 102 and the workstations 16.

Figure 2:
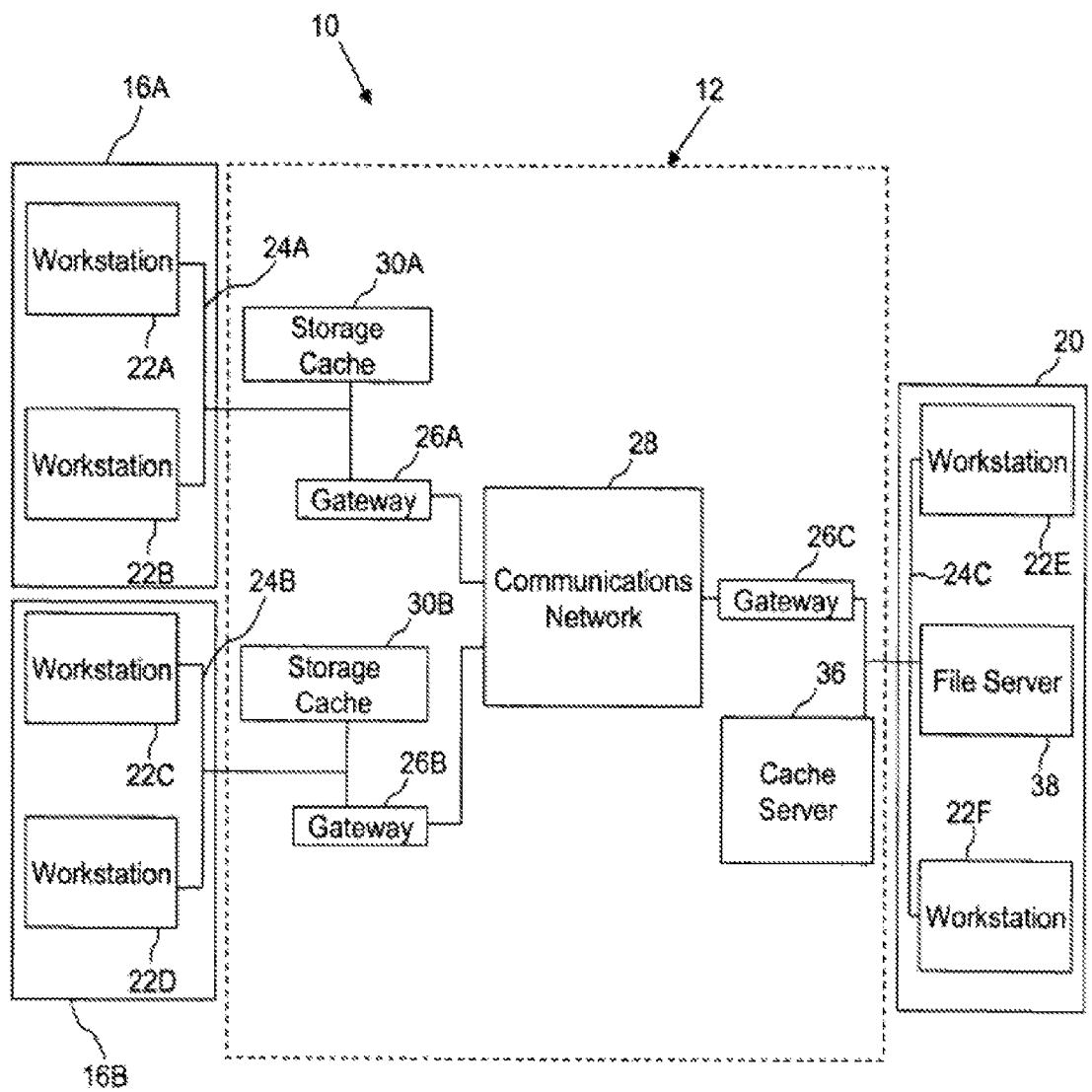
FIG. 2 is a lower-level block diagram illustrating an example computer network environment in which embodiments of the present invention might operate.

FIG. 2 is a block diagram showing, at a lower level, an example computer network environment in which embodiments of the present invention might operate. The network environment 10 includes a storage-caching protocol system 12 that interfaces with a distributed file system application operating at a data center computer system, which is a repository for data files, and a computer system which is associated with a computer workstation that desires to access, i.e., view only (read) or modify (write), data files stored at a file server of a data center system. The data center system is typically at a remote location relative to the computer system. The storage caching protocol system 12 includes at least one EFG appliance 30A, 30B (here referred to as a "storage cache"), which is coupled to a workstation of an associated remote system, and at least one remote file server appliance 36 (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

Storage caching protocol system 12 in the illustrative network 10 shown in FIG. 2, the system 12 interfaces with work group computer systems 16A and 16B and a central work group data center computer system 20. The system 16A includes computer workstations 22A and 22B interconnected over a communications channel 24A, such as an Ethernet or like medium. Similarly, the system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a system, in combination with the Ethernet, form a LAN and operate in accordance with a conventional distributed file system, such as NFS or CIFS, which provides that a user of a workstation can access data files located remotely from the system in which the workstation is contained.

A communications gateway 26 couples the Ethernet 24 of each of the systems 16 to a communications network 28. The network 28, for example, can be a WAN, LAN, the Internet or any like means for providing data communications links between geographically disparate locations. The gateway 26, for example, may implement a VPN Internet connection with remote gateways and support DSL speeds. The gateway 26 enables data, such as data files accessible in accordance with a distributed file system such as NFS or CIFS, to be transferred between a workstation and a remotely located file server. Furthermore, the functions of gateway 26 may be physically hosted on the same computing device as the storage cache and cache servers.

Referring again to FIG. 2, the storage caching system 12 includes storage caches (EFG appliances) 30A and 30B which are associated with the systems 16A and 16B, respectively. Each storage cache 30 is coupled to the Ethernet 24 and the gateway 26A, 26B of the associated system 16A, 16B. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a file storage device, such as a NAS (Network Attached Storage), which is a repository for data files and provides for distribution of stored data files to authorized workstations in accordance with the operation of distributed file systems, such as NFS or CIFS, which are implemented at the authorized workstations of the systems 16 and the data center 20. For purposes of illustration, it is assumed that all of the workstations 22 in the systems 16 and in the data center 20 constitute authorized workstations and operate in accordance with a distributed file system compatible with that of the server 38.

Figure 3:
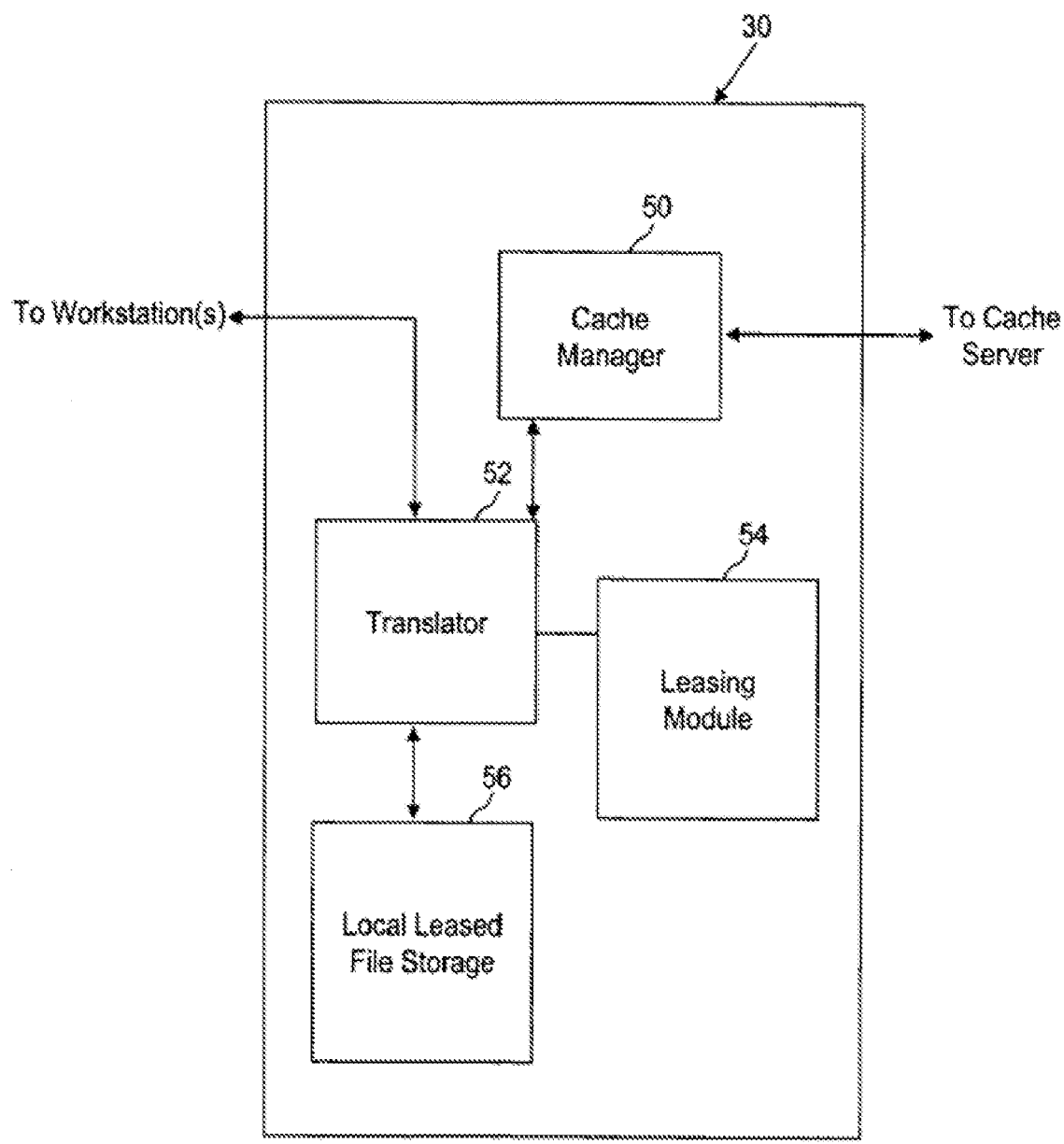
FIG. 3 is a block diagram illustrating the functional components of an EFG appliance (or server), which might be used in some embodiments of the present invention.

FIG. 3 is a block diagram of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. Typically, a storage cache is associated with every remote computer system that can access a data the stored at a file server of a data center system over the network 28.

Figure 4:
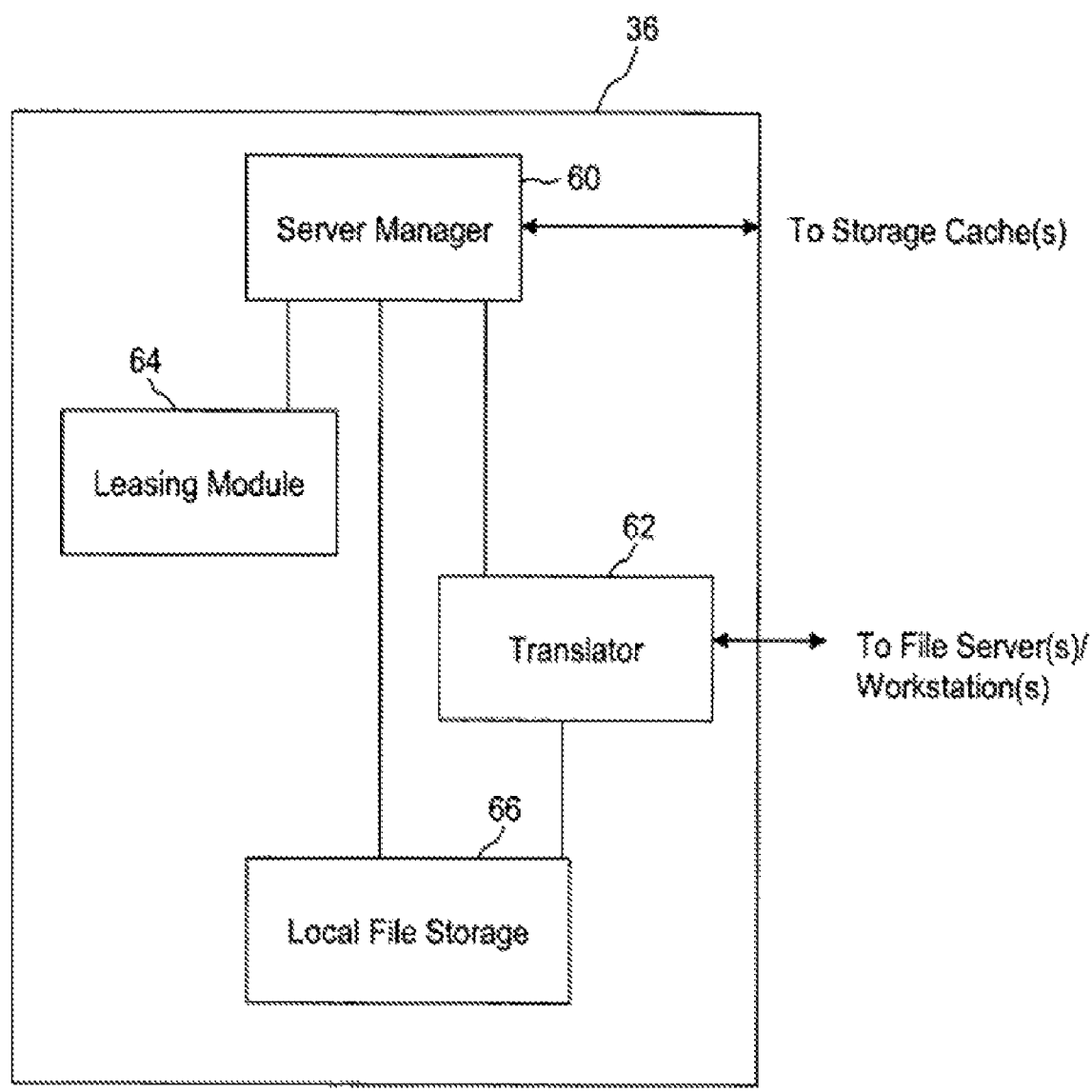
FIG. 4 is a block diagram illustrating the functional components of a CS appliance (or server)

FIG. 4 is a block diagram of the cache server (or CS appliance). The cache server manages shared access to data files stored in the file server by multiple storage caches, such as the caches 30A and 30B, and also by workstations, such as the workstations 22E and 22F of the data center 20, which are not associated with a storage cache. In some implementations, the cache server might be a thin appliance having an architecture that makes it compatible and easily integrated with a distributed file system, such as NAS and SAN (Storage Area Network), implemented at a computer system and a data center computer system.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores, at the storage 66, copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

The translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

The storage caches and the cache server, of the storage caching system, 12 provide that a data file stored in a file server of a data center, and available for distribution to authorized workstations via a distributed file system, can be accessed for read or write purposes by the workstations, that the workstations experience reduced latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

In a connected mode, file update data associated with the cached data the is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In some implementations, the local storage 56 of the storage cache includes only cached data files corresponding to recently accessed data files.

B. System Architecture for EFG Appliance (or Server) and CS (Remote) Appliance (or Server)

Figure 5:
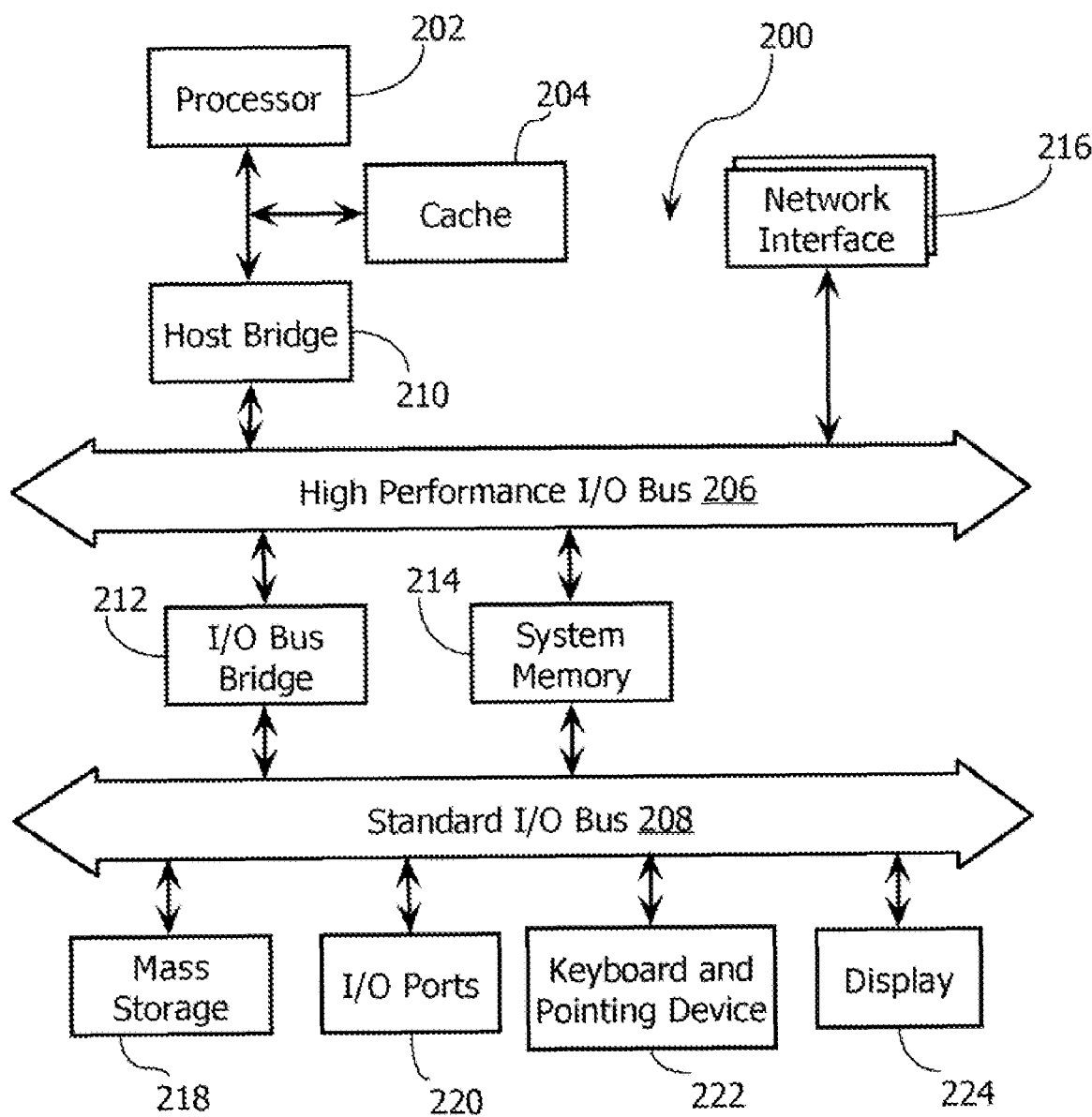
FIG. 5 is a diagram showing a high-level example system architecture that may be used to implement an EFG appliance (or server) or a CS appliance (or server)

FIG. 5 illustrates, for didactic purposes, a hardware system 200, which might be a part of an EFG appliance (or storage cache) or a remote file server appliance or cache server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., UNIX operating systems, and the like.

C. WAFS Disconnected-Mode Read-Write Access

In particular implementations, a WAN connection state machine may maintain indications in an appliance map file characterizing the connectivity to a remote file server appliance corresponding to a file space including a set of files and folders accessed by workstations 16. Portions of the claimed embodiments operate on an appliance map file when a connection between a network device, such as EFG 102, and a remote file server appliance, such as remote file server appliance 36, is lost. The appliance map file "maps" file objects contained in a cache of the network device to the remote file server appliance. Specifically, the network device has a separate appliance map file corresponding to each remote file server appliance that it is connected to it at any one time. Due to this, a network device may be in various, different states in relation specific remote file server appliances.

Figure 6:
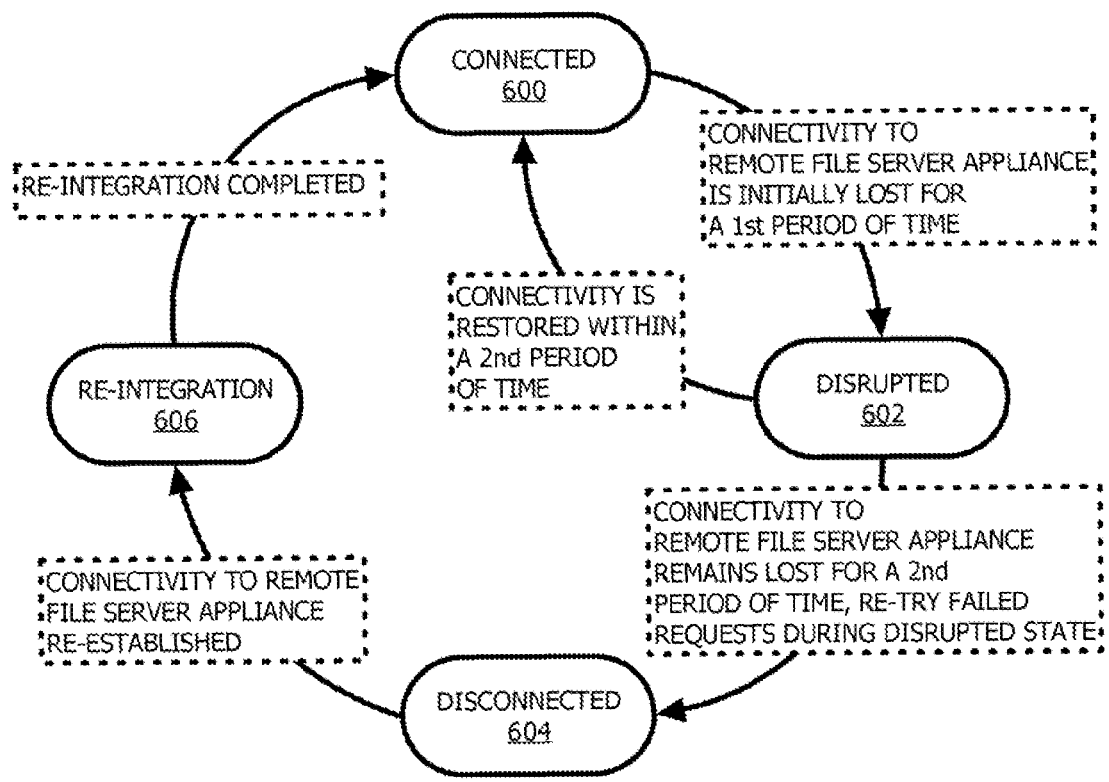
FIG. 6 is a state diagram illustrating state transitions, in accordance with an example embodiment.

A WAN connection state machine can be implemented in the network device and is operative to detect a current state of the network device, transition the network device to a next state and detect changes to the status of the WAN connection to the remote file server appliance. In one implementation, the WAN connection state machine defines four states which are illustrated in FIG. 6.

The network device is in a connected state 600 when the WAN connection to the remote file server appliance is established and has not experienced any disruptions. In one implementation, the WAN connection state machine monitors for activity with one or more remote file server appliances. In particular implementations, the EFG appliance may also include a pinger module operative to probe remote file server appliances to synthetically generate activity that is monitored, when there are no file commands or other operations transmitted across the network. For example, a disruption can be detected by using a pinger to send out RPCs at a steady rate. A certain number of consecutively-dropped RPCs may indicate a disruption to the connection. When a disruption is detected, the WAN connection state machine may wait for a first period of time to see if the connection to the remote file server appliance is restored. If the connection is restored within the first period of time, then the network device remains in the connected state 600. Otherwise, the WAN connection state machine transitions the network device to a disrupted state 602.

When the disrupted state 602 is entered, the WAN connection state machine may monitor the connection status for a second period of time. If the connection is re-established, the WAN connection state machine transitions the network device back to the connected state 600. Otherwise, the WAN connection state machine transitions the network device to a disconnected state 604 after the second time period expires. While in the disrupted state 602, the network device re-tries failed requests to the remote file server appliance upon failure.

While in the disconnected state 604, the network device does not re-try failed requests and further tracks and processes file object commands locally until the connection to the remote file server appliance has been restored. Once that occurs, the WAN connection state machine transitions the network device to a re-integration state 606 wherein the network device synchronizes the tracked, processed file object commands with the remote file server appliance. Once the synchronization is complete, the WAN connection state machine transitions the network device to the connected state 600.

FIGS. 7-10 detail how the network device tracks and processes file object commands while in the disconnected state 604. For every appliance map file, the network device maintains two lists—an uncommitted object list (UOL) and a committed file list (COL). The COL maintains information about all file objects for which there was an open write-lease. In one implementation, this is determined from a point in time when the connection to the remote file server appliance was determined to have been lost. The UOL contains information about file objects that were created or renamed after the point of time of disconnection. The UOL can additionally contain a file index number ("FRN") of a file object represented locally at the network device and a name used to create a file object.

In one implementation, the WAN connection state machine may transition the network device from the re-integration state 606 to the disconnected state 604 it the connection to the remote file server appliance is again lost. In this situation, any unprocessed, remaining entries in the COL and UOL are maintained and processed when the re-integration state 606 is re-entered.

Figure 7:
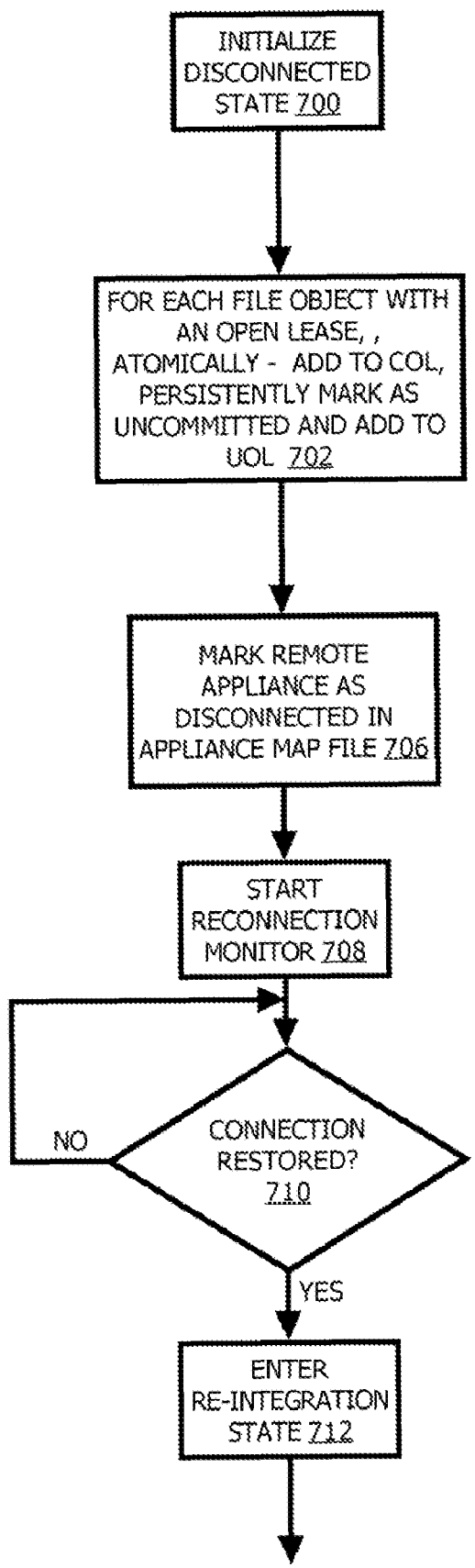
FIG. 7 is a flow chart diagram further illustrating transition into and out of the disconnected state of FIG. 6, in accordance with an example embodiment.

FIG. 7 is a flowchart diagram illustrating general operations of the network device starting from when the disconnected state 604 begins. After state 604 is entered (700), the network appliance atomically, for each file object with an open lease, adds an entry of the file object to the COL, persistently marks the file object as uncommitted and adds an entry of the file object to the UOL (702).

The network appliance then marks (706) the remote file server appliance as disconnected in its corresponding appliance map file. In turn, the network appliance starts a re-connection monitor (708), monitors for, via the re-connection monitor, the connection to the remote file server appliance to be restored (710) and transitions (712) to the re-integration state 606 when the connection is re-established.

It should be noted that during operation 702 will typically be executed only on file objects that have an open read-write lease before the disconnected state 604 is entered. Any file objects that have an open read lease when the network device enters the disconnected state 604 are not added, via an entry, to the COL or UOL and any write operations to those file objects are failed/not allowed.

Regarding marking of a file object by the network device, the network device marks a persistent "uncommitted" flag associated with the file object. In later sections, "is file object marked committed," or variants thereof, will be mentioned. This refers to checking of this persistent "uncommitted" flag.

As previously indicated, there are typically two types of leases—a read lease and a read/write lease. When the network device is in the disconnected state 604 and the network device receives an open request for a cached file object that does not have a lease, an implicit read lease is granted. The granting of an implicit read lease can also potentially be granted during an initial portion of the disconnected state 606 when the network device is constructing the COL and UOL as detailed in the next section.

During the execution of operations 702, the network device may also receive file object commands such as save or save as. When this occurs, the network device will convert the related file object to an uncommitted file object—the network device records an entry for the file object in the COL, marks a file object flag of the object as uncommitted and furthers records an entry of the file object in the UOL. The network device then performs the file object command on the file object.

Additionally, if a new file object is created during the disconnected state 604, the network device will mark its flag as uncommitted and record an entry in the UOL.

Furthermore, if a duration of the disconnected state 606 is short, there may be no modifications to any of the file objects that have entries in the COL and UOL. Restated, the connection to the remote file server appliance is restored in a fairly quick manner. For such an instance, the lease of those file objects will merely be verified via the later re-integration state 606.

While in the disconnected state 604, the network device will typically receive file object commands as users request certain actions to be performed. Those actions are typically user-level type commands and can include open, save and save as. These user-level commands can result in one or more system-level file object commands such as create, rename and delete. One example is that a save user-level command can generate a rename and create system-level file object commands.

Figure 8:
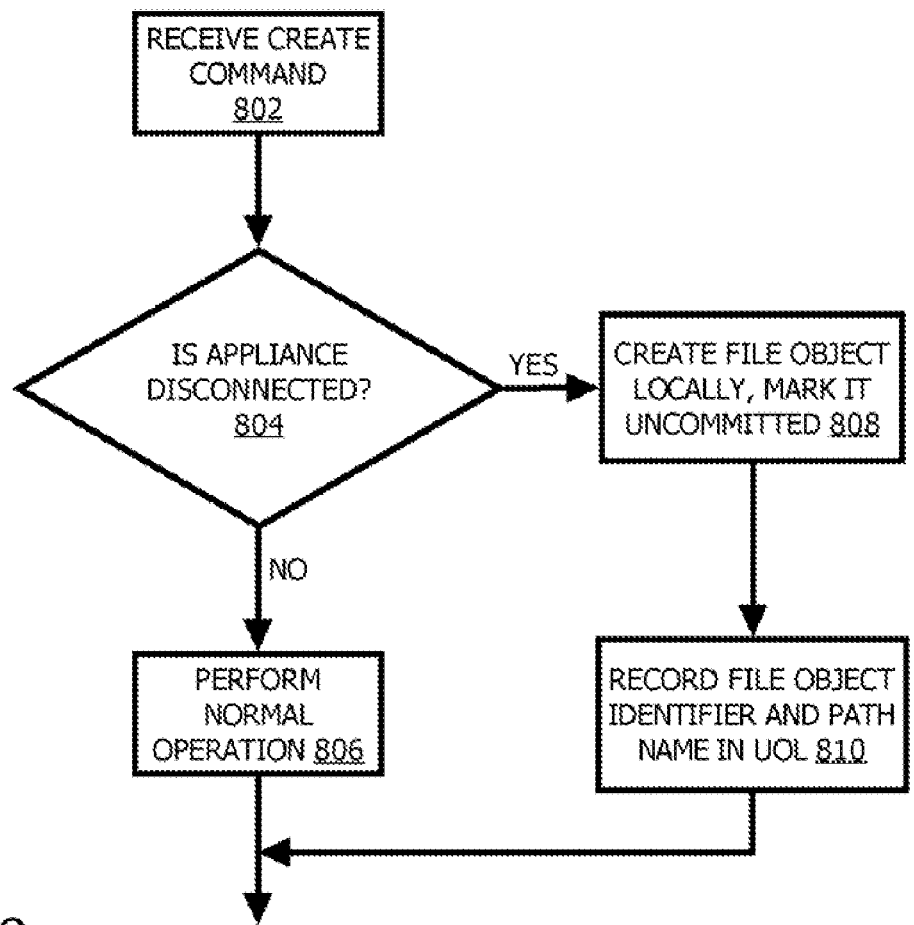
FIG. 8 is a flow chart diagram illustrating a method for processing a file object create command, in accordance with an example embodiment.
Figure 9:
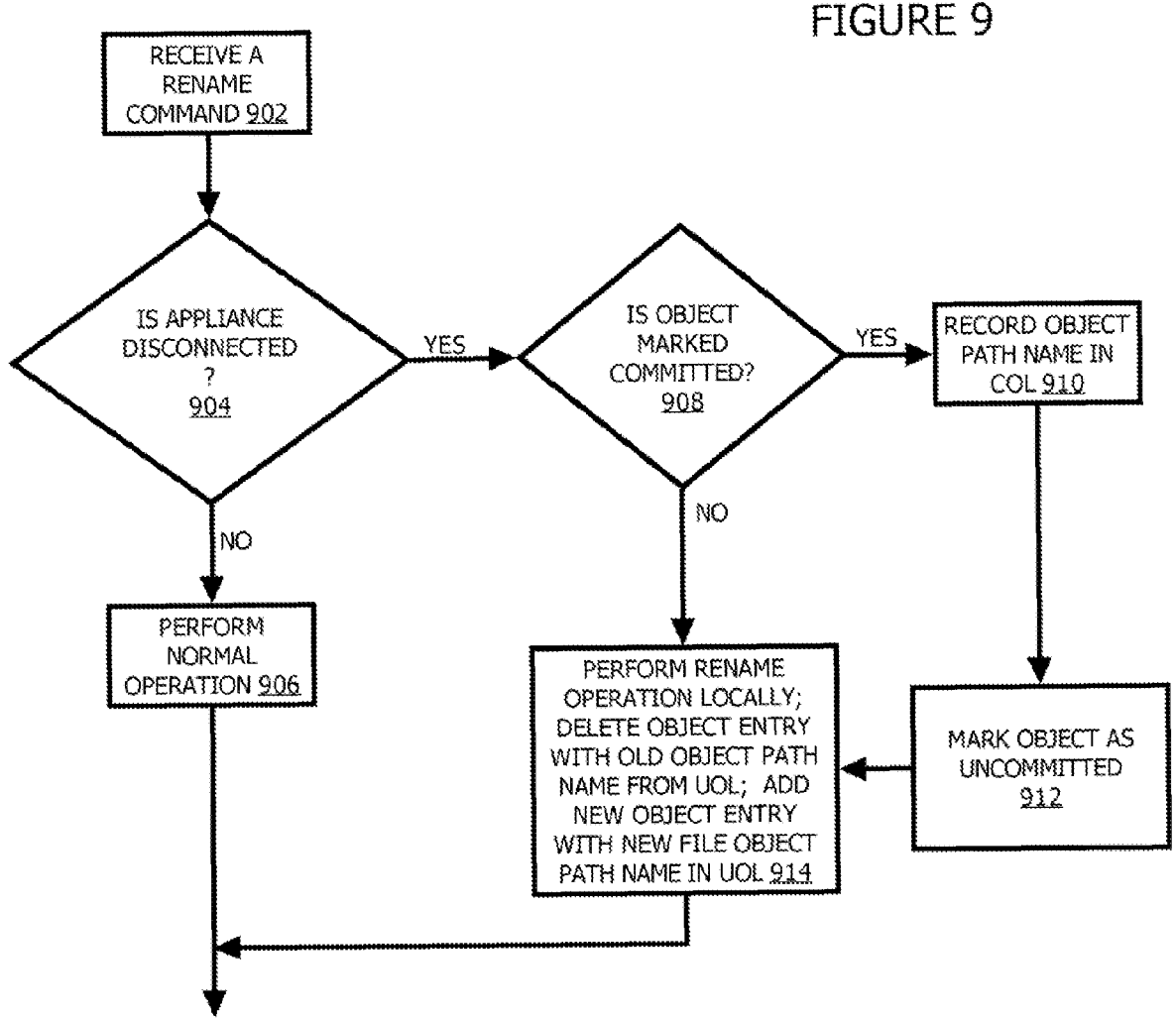
FIG. 9 is a flowchart diagram illustrating a method for processing a file object rename command, in accordance with an example embodiment.
Figure 10:
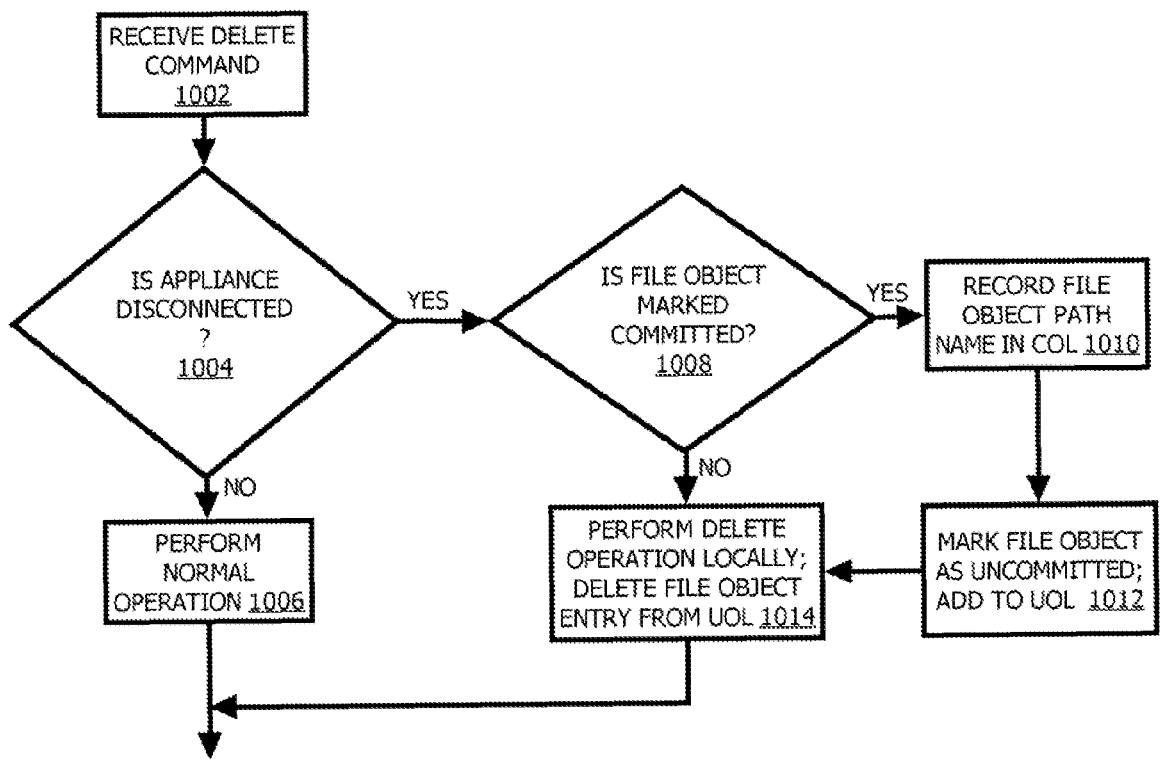
FIG. 10 is a flowchart diagram illustrating a method for processing a file object delete command, in accordance with an example embodiment.

With that in mind, FIGS. 8-10 are flowchart diagrams that illustrate processing of create (FIG. 8), rename (FIG. 9) and delete (FIG. 10) system-level file object commands while the network device is in the disconnected state 606 and a summary of those operations will first be presented before a description of those related figures. Additionally, it should be noted that as the various file object commands are processed and logged, the sequence of those events should also preferably be tracked to prevent false-positive conflict conditions during the re-integration state 606 which will be further described in a later section.

If a new file object is being created, the network device records path name and file index number ("FRN") of the new file object in an entry of the UOL. Additional information may also be recorded as necessary.

If a file object being deleted or renamed is marked as committed, that is, there is an active write lease, the network device records the file object's path name in a COL entry, and performs the requested operation (delete or rename) after marking it uncommitted—that is, no lease. If the file object was not marked as committed, the network device performs the requested operation (delete or rename). If a file object being renamed is already marked as uncommitted, the network device removes the old name from the UOL and inserts the new name via a new UOL entry. If a file object being deleted is already marked as uncommitted, the network device removes its entry from the UOL.

As previously mentioned, FIG. 8 illustrates processing of a create file object command which begins with the network device receiving a create file object command (802) and determining if its related appliance map file is marked as disconnected (804). If no, the network device performs normal processing of the command (806). Otherwise, the network device creates a file object locally, marks it as uncommitted and records the file object as an entry (identifier and path name) in the UOL via operations 808 and 810.

FIG. 9 illustrates processing of a rename file object command. First, the network device receives a rename file object command (902) and determines if its related appliance file map is marked as disconnected (904). If no, the network device performs the rename command (906). If the appliance map file is marked as disconnected (904), the network device then determines if the file object is marked as committed (908). If yes, the network device records the file object as a COL entry (910), marks the file object as uncommitted (912). After operation 912, the network device performs the rename operation on the file object locally, deletes a corresponding object entry with an old object path name from the UOL and adds a new object entry with an associated new object path name in the UOL (914). If the file object is not marked as committed (908), then the network device skips operations 910 and 912 and performs the rename operation (914).

In one implementation, when a file object is successfully renamed locally (914), the associated file object can additionally be marked as uncommitted and its new name is added via an entry to the UOL.

Processing of a delete file object command is illustrated via FIG. 10. First, the network device receives a delete file object command (1002) and determines if its related appliance file map is marked as disconnected (1004). If no, the network device performs the delete command (1006). If the appliance map file is marked as disconnected (1004), the network device then determines if the file object is marked as committed (1008). If yes, the network device records the file object as a COL entry (1010), marks the file object as uncommitted and further adds a UOL entry (1012). After operation 1012, the network device performs the delete operation on the file object and deletes a corresponding file object entry from the UOL (1014). If the file object is not marked as committed (1008), then the network device skips operations 1010 and 1012 and performs the rename operation (1014).

Figure 11:
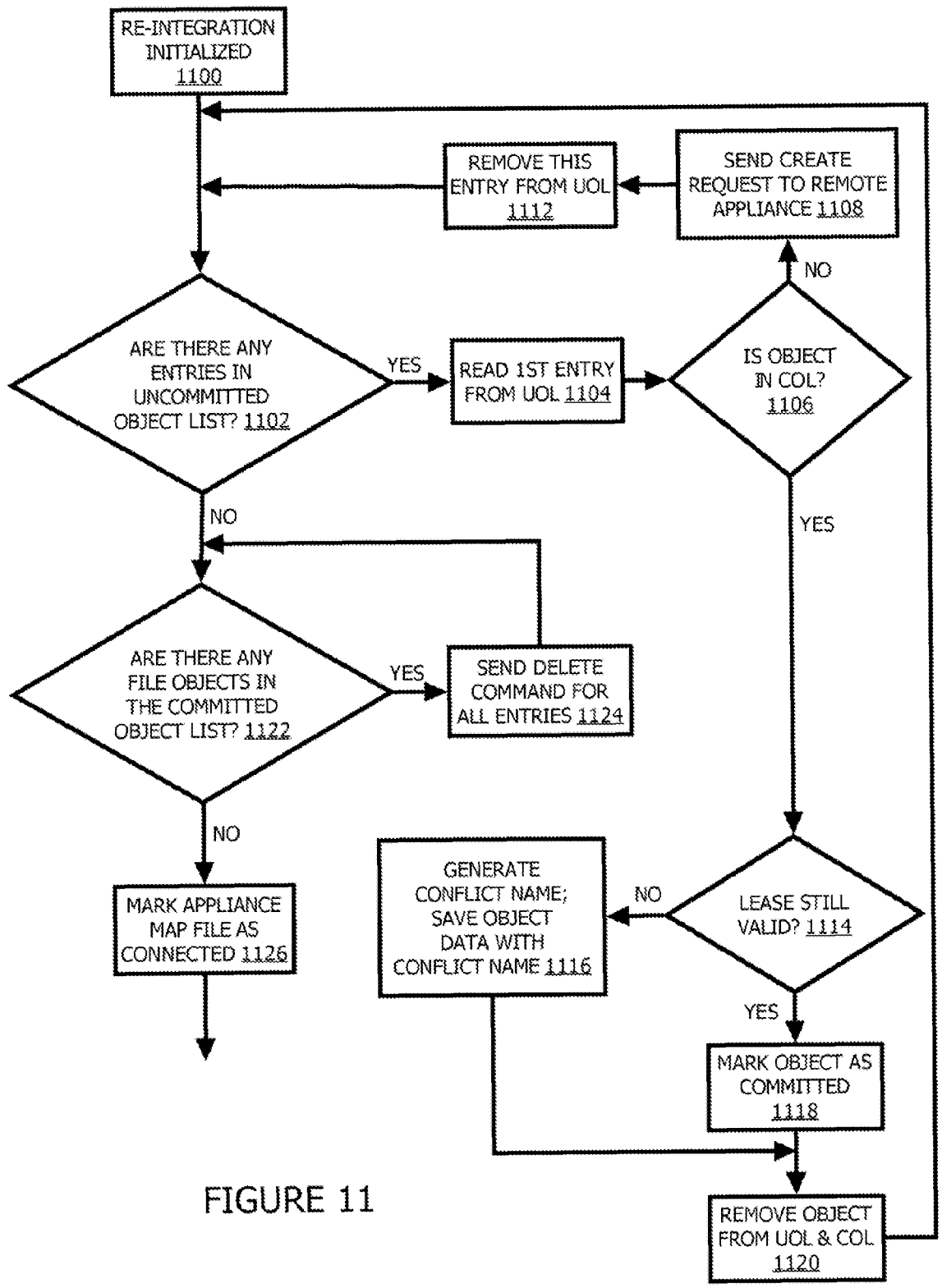
FIG. 11 is a flowchart diagram illustrating a method for re-integrating file object commands processed during the disconnected state, in accordance with an example embodiment.

Once the connection to the remote file server appliance is restored, the network device transitions to the re-integration state 606 and processing of the UOL and Col entries during this state are detailed via FIG. 11.

Summarized, the network device generally processes each entry of the UOL (1102, 1104) by determining if the entry has a matching entry in the COL (1106). If yes, the network device determines if the lease is still valid (1114). If the lease is not valid, the network device generates a conflict name and saves related file object data along with the file object name (1116). Otherwise, the network device marks the file object as committed (1118). After either of operations 1116 or 1118, the network device removes the file object from the COL and the UOL (1120) and proceeds to operation 1102.

If the result of operation 1106 is negative, the network device sends (1108) a create request to the remote file server appliance to create an object with the recorded name in the UOL entry and removes the related UOL entry (1112). The request sent via operation 1108 facilitates detection and resolving of potential conflicts at the remote file server appliance. Restated, the remote file server appliance performs conflict resolution detection and resolution for newly-created file objects.

Due to a CIFS limitation, if there are too many UOL entries (handles) open at a time to process thus resulting in a communication loss to the remote file server appliance and related file server, the network device will send, after a delay, a special error code to the remote file server appliance to retry the operation.

For the COL, the network device sends requests to the remote file server appliance for each entry to delete those objects (1122, 1124) as they have been dealt with due to corresponding entries in the UOL. The network device then marks the appliance map file as connected (1126) and transitions to the connected state 600.

The claimed embodiments provide numerous advantages such an ability to maintain a connection state machine with automatic transition between the different states based on the WAN connection status, maintaining lease/lock infrastructure for cache coherency, logging a minimal set of data for the COL and UOL during the disconnected state 604, a reduction of path-name based lookups as well as conflict name handling.

Additionally, the claimed embodiments can also be utilized to implement a WAN outage policy to control when a WAN link can be used to reintegrate and synchronize data. Another possible implementation is to use the claimed embodiments for emergency downtime such as a hard drive failure at the remote file server appliance or related file servers.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus comprising
a memory,
one or more network interfaces,
one or more processors; and
logic encoded in one or more computer readable media, the logic comprising computer executable instructions operative to cause the one or more processors to implement:
a connection state machine operative to
monitor connectivity to one or more remote file server cache nodes;
maintain state indications of the connectivity to one or more remote file server cache nodes;
a wide area file system module operative to
emulate a file server to one or more client nodes;
access, responsive to requests of the one or more client nodes, file objects and obtain corresponding leases from one or more remote file server cache nodes;
store the file objects received from the one or more remote file server cache nodes in a local cache for access by the one or more client nodes;
maintain a mapping of file objects stored in a local cache to corresponding remote file server cache nodes;
forward requests for file system operations from the one or more client nodes to corresponding remote file server cache nodes;
wherein the wide area file system module is further operative to:
responsive to a loss of connectivity to a first remote file server cache node,
perform file system operations requested by the one or more client nodes locally in the local cache;
track the file system operations in one or more data structures; and
responsive to regaining connectivity to the first remote file server cache node, synchronize the file system operations tracked in the one or more data structures with the first remote file server cache node.

2. The apparatus of claim 1 wherein the wide area file system module is operative, responsive to the loss of connectivity to the first remote file server cache node, to
create a committed object data structure for the first remote file server cache node identifying file objects corresponding to the first remote file server cache node for which open read-write leases exist;
mark the file objects for which open read-write leases exist as uncommitted; and
add the file objects for which open read-write leases exist to an uncommitted object data structure for the first remote filing sharing node.

3. The apparatus of claim 2 wherein the wide area file system module is operative, responsive to the loss of connectivity to the first remote file server cache node, to perform file system commands identifying file objects on the local cache,
add to the uncommitted object data structure file object entries for file objects renamed and created during the loss of connectivity;
adding to the committed object data structure file object entries for file objects marked as committed for file objects deleted and renamed during the loss of connectivity.

4. The apparatus of claim 3 wherein the wide area file system module is operative, responsive to regaining connectivity to the first remote file server cache node, to
send create requests to remote file server appliance for all locally created file objects in the uncommitted object data structure and not identified in the committed object data structure;
validate leases or resolve conflicts for file objects identified in the uncommitted and committed object lists;
send delete requests for file objects identified only in the committed object list.

5. A method for use in a network device operative to process requests, pertaining to remotely-stored file objects, between a local user and a remote file server appliance operative to retrieve and store the remotely-stored file objects, the network device further operative to request and maintain write-leases on one or more of the remotely-stored file objects, the method comprising:
detecting a connectivity loss to the remote file server appliance;
transitioning from a connected state to an un-connected state upon detection of the connectivity loss;
while in the un-connected state:
creating a committed object list ("COL") based on file objects with open write leases;
initializing an un-committed object list ("UOL");
receiving a file object command; and
selectively adding or removing a file object entry to the COL or UOL based on the received command and write lease status of the associated file object;
detecting restoration of connectivity to the remote file server appliance;
transitioning from the un-connected state to a re-integration state upon detection of the restoration;
while in the re-integration state:
processing entries in the COL and UOL; and
transitioning to the connected state once the COL and UOL entries have been processed.

6. The method as recited in claim 5 wherein if the received command is a create command then:
creating the file object;
marking the file object as uncommitted; and
is adding an entry to the UOL based on the created file object.

7. The method as recited in claim 5 wherein if the received command is a rename command then:
if the file object to be renamed is committed then:
adding an entry to the COL based on the file object to be renamed; and
marking the file object, to be renamed, uncommitted;
deleting an old UOL entry of the file object to be deleted;
adding an entry to the UOL based on the file object to be renamed; and
renaming the file object.

8. The method as recited in claim 5 wherein if the received command is delete command then:

if the file object to be deleted is committed then:
  adding an entry to the COL based on the file object to be deleted; and
  marking the file object, to be deleted, uncommitted;
deleting an entry to the UOL based on the file object to be deleted; and
deleting the file object.

9. The method as recited in claim 5 wherein processing the UOL entries comprises:
determining if a UOL entry matches a COL entry;
determining if a lease is valid for the UOL entry, if there is a matching COL entry;
marking a related file object as committed if the lease is valid;
generating a conflict if the lease is not valid;
removing entries from the COL and UOL if the object is not in the COL;
sending a request to the remote file server appliance to create a file object based on the UOL entry, if there is no matching COL entry; and
removing the UOL entry from the UOL.

10. The method as recited in claim 9 further comprising:
sending a request to the remote file server appliance to create a file object based on the UOL entry; and
removing the UOL entry.

11. The method as recited in claim 5 wherein processing the COL entries comprises sending one or more request to the remote file server appliance to delete file objects corresponding to the COL entries.

12. The method as recited in claim 5 further comprising:
during the un-connected state, marking the remote file server appliance as un-connected in an appliance map file;
after the re-integration state, marking the remote file server appliance as connected in the appliance map file; and
wherein the appliance map file is operative to define file objects in a network device cache as corresponding to the remote file server appliance.

13. The method as recited in claim 5 wherein the un-connected state comprises a disrupted state and a disconnected state wherein the disrupted state transitions to the disconnected state.

14. The method as recited in claim 13 wherein the connected state transitions to the disrupted state if connectivity to the remote file server appliance is not restored within a first threshold amount of time.

15. The method as recited in claim 14 wherein the disrupted state transitions to the connected state if connectivity to the remote file server appliance is restored within the first threshold amount of time.

16. The method as recited in claim 14 wherein the disrupted state transitions to the disconnected state if connectivity to the remote file server appliance is not restored within a second threshold amount of time.

17. The method as recited in claim 5 wherein the re-integration state transitions to the disconnected state if connectivity to the remote file server appliance is lost.

18. A network device operative to process requests, pertaining to remotely-stored file objects, between a local user and a remote file server appliance operative to retrieve and store the remotely-stored file objects, the network device further operative to request and maintain write-leases on one or more of the remotely-stored file objects, the network device comprising:
one or more network interfaces;
one or more processors;
a memory;
an WAN connection state machine, stored in the memory, including instructions operable to cause the one or more processors and the network device to:
detect a connectivity loss to the remote file server appliance;
transition from a connected state to art un-connected state upon detection of the connectivity loss;
while in the un-connected state:
  create a committed object list ("COL") based on file objects with open write leases;
  initialize an un-committed object list ("UOL");
  receive a file object command; and
  selectively add or remove a file object entry to the COL or UOL based on the received command and write lease status of the associated file object;
detecting restoration of connectivity to the remote file server appliance;
transition from the un-connected state to a re-integration state upon detection of the restoration;
while in the re-integration state:
  process entries in the COL and UOL; and
  transition to the connected state once the COL and UOL entries have been processed.

19. The network device as recited in claim 18 wherein the un-connected state comprises a disrupted state and a disconnected state wherein the WAN connection state machine further comprises instructions to transition the network device from the disrupted state to the disconnected state.

20. The network device as recited in claim 18 wherein the WAN connection state machine further comprises instructions to transition the network device from the re-integration state to the disconnected state if connectivity to the remote file server appliance is lost.

* * * * *